US010859120B2

(12) United States Patent
Pilk et al.

(10) Patent No.: US 10,859,120 B2
(45) Date of Patent: Dec. 8, 2020

(54) TAPERED ROLLER BEARING AND WIND TURBINE

(71) Applicants: THYSSENKRUPP ROTHE ERDE GMBH, Dortmund (DE); thyssenkrupp AG, Essen (DE)

(72) Inventors: Bernfried Pilk, Erwitte (DE); Simone Angelo Santoro, Lippstadt (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/498,561

(22) PCT Filed: Apr. 6, 2018

(86) PCT No.: PCT/EP2018/058867
§ 371 (c)(1),
(2) Date: Sep. 27, 2019

(87) PCT Pub. No.: WO2018/185288
PCT Pub. Date: Oct. 11, 2018

(65) Prior Publication Data
US 2020/0063799 A1 Feb. 27, 2020

(30) Foreign Application Priority Data
Apr. 7, 2017 (DE) .................... 10 2017 107 553

(51) Int. Cl.
*F16C 33/78* (2006.01)
*F16C 19/38* (2006.01)
(Continued)

(52) U.S. Cl.
CPC ........ *F16C 33/7813* (2013.01); *F16C 19/386* (2013.01); *F16C 33/783* (2013.01);
(Continued)

(58) Field of Classification Search
CPC .. F16C 2360/31; F16C 33/60; F16C 33/7826; F16C 33/783; F16C 33/7813;
(Continued)

(56) References Cited

U.S. PATENT DOCUMENTS

2010/0247295 A1 9/2010 Hofmann
2013/0163907 A1* 6/2013 Yamamoto ............. F16C 33/76
384/463

(Continued)

FOREIGN PATENT DOCUMENTS

CN 101852247 A 10/2010
CN 105473881 A 4/2016
(Continued)

OTHER PUBLICATIONS

Machine Translation of DE102012212792 (Year: 2014).*
(Continued)

*Primary Examiner* — Alan B Waits
(74) *Attorney, Agent, or Firm* — thyssenkrupp North America, LLC

(57) ABSTRACT

A tapered roller bearing may comprise an inner ring, an outer ring, and two rows of tapered rollers that are arranged in an O-arrangement between the inner ring and the outer ring. The inner ring may extend in an axial direction over a greater length than the outer ring, and a gap between the inner ring and the outer ring on at least one side of the tapered roller bearing may be sealed by a sealing assembly. The sealing assembly may comprise a main seal that is attached to the inner ring in a rotationally fixed manner, as well as a seal race ring that is attached to the outer ring in a rotationally fixed manner. The seal race ring may form a seal raceway for the main seal.

10 Claims, 3 Drawing Sheets

(51) Int. Cl.
*F03D 80/70* (2016.01)
*F16C 33/60* (2006.01)

(52) U.S. Cl.
CPC ...... *F16C 33/7826* (2013.01); *F16C 33/7886* (2013.01); *F16C 33/7889* (2013.01); *F16C 33/7896* (2013.01); *F03D 80/70* (2016.05); *F05B 2240/50* (2013.01); *F16C 33/60* (2013.01); *F16C 2300/14* (2013.01); *F16C 2360/31* (2013.01)

(58) Field of Classification Search
CPC .............. F16C 33/7886; F16C 33/7889; F16C 33/7896; F16C 33/80; F16C 19/386; F16C 2300/14; F03D 80/70; F05B 2240/50
See application file for complete search history.

(56) References Cited

U.S. PATENT DOCUMENTS

| | | |
|---|---|---|
| 2014/0010655 A1 | 1/2014 | Hofmann |
| 2016/0108966 A1 | 4/2016 | Krebs |
| 2016/0229470 A1 | 8/2016 | Suzuki |
| 2020/0025252 A1* | 1/2020 | Rettinger ............ F16C 33/6622 |

FOREIGN PATENT DOCUMENTS

| | | | |
|---|---|---|---|
| CN | 105556147 A | | 5/2016 |
| CN | 106460802 A | | 2/2017 |
| DE | 20 2010 014 830 U | | 3/2011 |
| DE | 102011011163 | * | 8/2012 |
| DE | 10 2012 212 792 A | | 1/2014 |
| DE | 10 2013 208 203 A | | 11/2014 |
| DE | 10 2009 014 923 C | | 7/2015 |
| DE | 10 2014 205 811 A | | 10/2015 |
| DE | 102014104863 A | | 10/2015 |
| DE | 10 2017 107 005 B | | 9/2018 |
| EP | 2 669 541 A | | 12/2013 |
| EP | 3 048 319 A | | 7/2016 |
| WO | 2007/119953 A | | 10/2007 |
| WO | 2015150158 A | | 10/2015 |
| WO | 2018177459 A | | 10/2018 |

OTHER PUBLICATIONS

Machine Translation of DE102011011163 (Year: 2012).*
English Translation of International Search Report issued in PCT/EP2018/058867, dated Jul. 3, 2018.

* cited by examiner

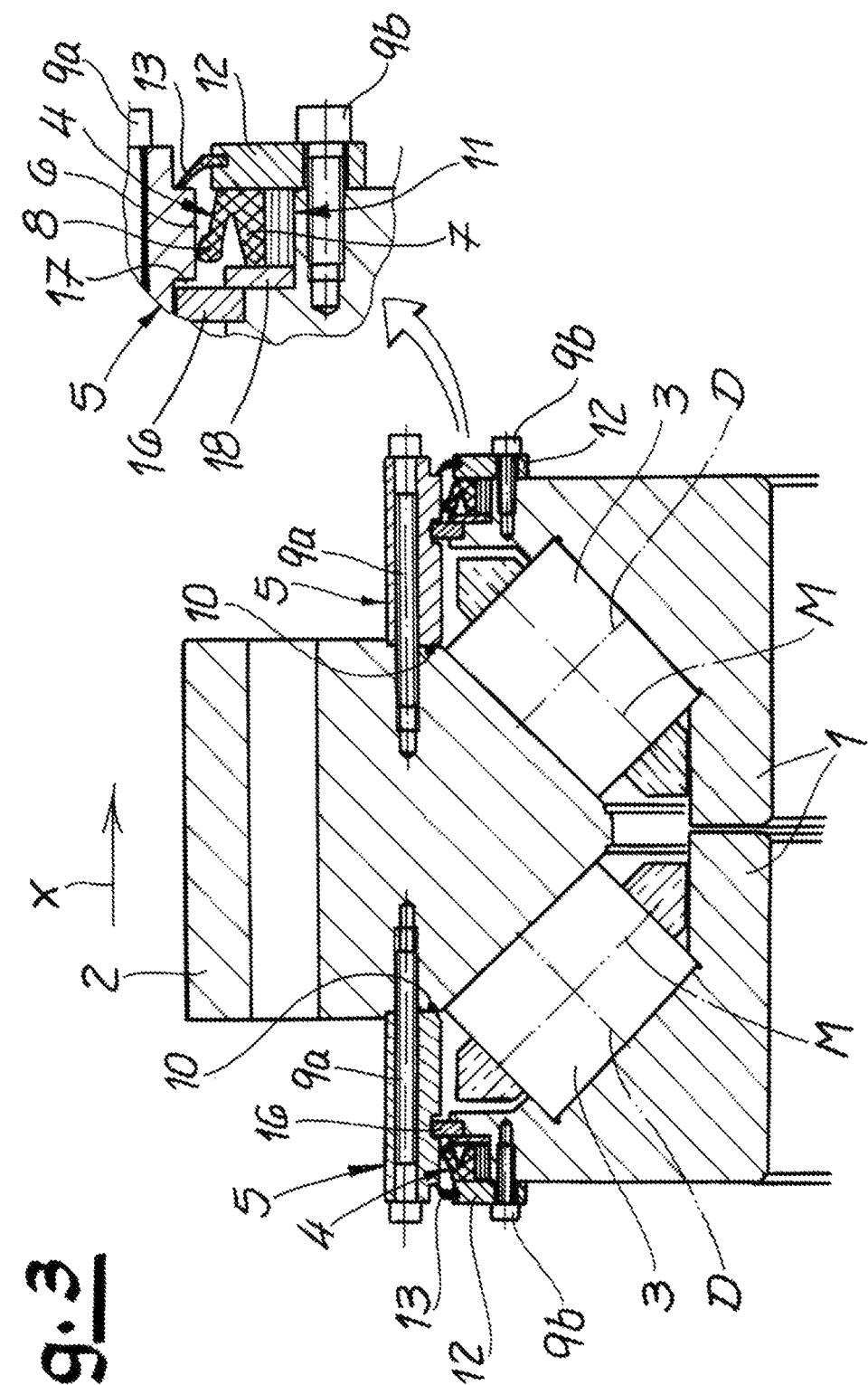

TAPERED ROLLER BEARING AND WIND TURBINE

CROSS REFERENCE TO RELATED APPLICATIONS

This application is a U.S. National Stage Entry of International Patent Application Serial Number PCT/EP2018/058867, filed Apr. 6, 2018, which claims priority to German Patent Application No. DE 10 2017 107 553.4, filed Apr. 7, 2017, the entire contents of both of which are incorporated herein by reference.

FIELD

The present disclosure generally relates to roller bearings and/or wind turbines.

BACKGROUND

It is known to use tapered roller bearings in wind turbines and other machinery. Generic tapered roller bearings, which are used as a main bearing of a wind turbine, are known from German Patent Application No. DE 10 2009 014 923 C5 as well as from International Patent Publication No. WO 2007/119953 A1. According to German Patent Application No. DE 10 2009 014 923 C5, the seal raceway can be hardened as thrust surface for the seal and can be manufactured with high precision, for the purpose of which the seal raceway can be ground free of twists, for example. Low friction coefficients as well as a low wear are to be achieved with corresponding measures.

BRIEF DESCRIPTION OF THE FIGURES

FIG. 3 is a sectional view of still another example tapered roller bearing.

DETAILED DESCRIPTION

Figure 1:
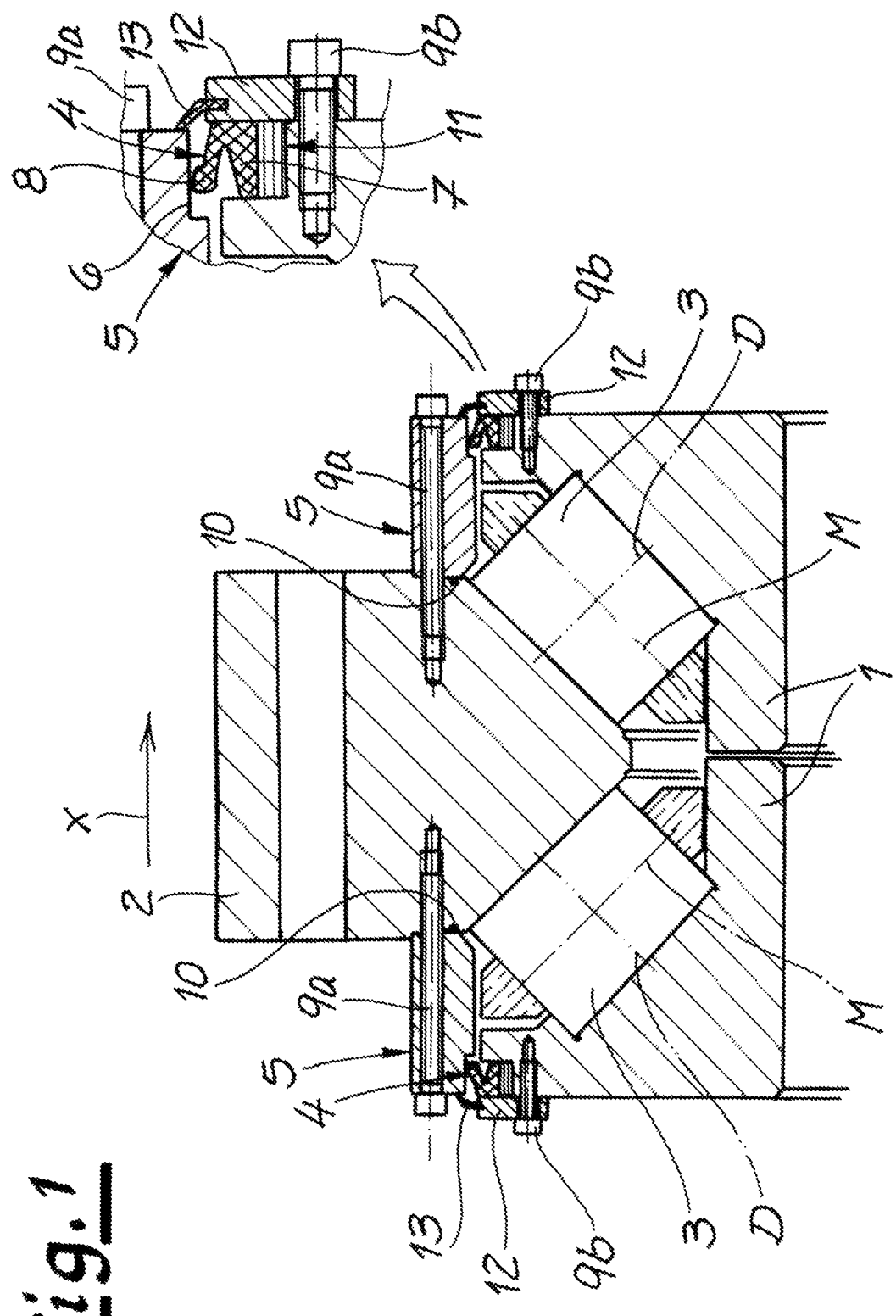
FIG. 1 is a sectional view of an example tapered roller bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a tapered roller bearing, in particular a large-diameter tapered roller bearing comprising an inner ring, an outer ring, and two rows of tapered rollers, which are arranged in an O-arrangement between the inner ring and outer ring, wherein the inner ring extends in an axial direction over a greater length than the outer ring, and wherein a gap between inner ring and outer ring on at least one side is sealed by a sealing assembly.

A wind turbine comprising a machine housing arranged on a tower, and a rotor supporting rotor blades is furthermore also subject matter of the invention, wherein the rotor is rotationally supported with respect to the machine housing by means of the tapered roller bearing. The tapered roller bearing thus forms the rotor bearing, which is also referred to as main bearing in the case of a wind turbine.

The tapered roller bearing is preferably embodied as large-diameter tapered roller bearing. In the context of the invention, roller bearings, which comprise a race diameter of more than 500 mm and typically also of more than 1000 mm, are referred to as large-diameter roller bearings.

Specific requirements result for the design of a large-diameter roller bearing. Solely on the basis of its size and the loads to be absorbed, a large material requirement and a high weight result, which has to be absorbed in the installed state by a corresponding support structure. The material and manufacturing costs are also significant for the production of large-diameter roller bearings, in particular because the inner ring as well as the outer ring are often formed from rings, which are seamlessly rolled around the circumference, and because the raceways for the roller elements are subjected to an additional hardening.

While small roller bearings are often designed as easily exchangeable wear parts, a long service life as well as a simple maintenance and repair without a complete removal are advantageous in the case of large-diameter roller bearings, because large-diameter roller bearings can only be handled and exchanged with significant effort due to their weight and their size. This applies in particular for large-diameter roller bearings, which as main bearing, support the rotor supporting the rotor blades in the case of a wind turbine.

When being used on a wind turbine, the tapered roller bearing has to absorb radial forces, axial forces, and in particular also significant tilting moments. In the case of a rotor, which is aligned essentially horizontally, tilting moments can result from the weight of the attached components on the one hand as well as from wind loads, which differ over the height, on the other hand.

To be able to absorb the corresponding loads, two-rowed tapered roller bearings having an O-arrangement of the two rows of tapered rollers have proved their worth in practice. In the case of an O-arrangement, the points of intersection through the longitudinal axis of the tapered rollers in the two rows are shifted in the direction of the inner ring. The name O-arrangement follows from the fact that the pressure curves associated with the two rows form an O-shape in the broadest sense in a cross section.

To be able to arrange the tapered rollers between the inner ring and the outer ring, the inner ring is usually at least divided into two parts in the axial direction, while the outer ring, which has a nose-shape in the cross section, can be formed as a single part.

Depending on the demands, however, a design of multiple parts can also be considered for the outer ring in the axial direction, wherein inner ring and outer ring can also be formed from a plurality of segments in the circumferential direction.

Generic tapered roller bearings, which are used as main bearing of a wind turbine, are known from DE 10 2009 014 923 C5 as well as from WO 2007/119953 A1 (FIG. 3).

In the case of the known generic tapered roller bearings, a sealing assembly, which seals the gap between inner ring and outer ring, is in each case provided on the two sides of the tapered roller bearing. In the case of both sealing assemblies, a seal in the form of a sealing ring is attached to the outer ring of the tapered roller bearing in a rotationally fixed manner via a holding ring in each case. The seal, which is attached to the outer ring in a rotationally fixed manner, can be embodied, for example, in the manner of a rotary shaft seal comprising a resilient sealing leg or a sealing lip, respectively. A seal raceway for the seal is formed by a radial outer surface of the inner ring, which is divided in the axial direction.

According to DE 10 2009 014 923 C5, the seal raceway can be hardened as thrust surface for the seal and can be manufactured with high precision, for the purpose of which the seal raceway can be ground free of twists, for example. Low friction coefficients as well as a low wear are to be achieved with corresponding measures.

Corresponding machining on a radial outer surface of the inner ring are complex. In the case of damages to the seal raceway by wear or in the case of mechanical damage during the assembly, the entire tapered roller bearing has to be exchanged, when a sufficient tightness is no longer ensured.

In light of the foregoing, the present invention is based on the object of further developing a generic tapered roller bearing in such a way that, in addition to a long service life, expanded maintenance options are also provided. A wind turbine comprising such a tapered roller bearing is to furthermore be specified, wherein a bearing change is associated with a very large effort in particular in the case of wind turbines.

Based on a generic tapered roller bearing, it is thus provided according to the invention that the sealing assembly comprises a main seal, which is attached to the inner ring in a rotationally fixed manner, as well as a seal race ring, which is attached to the outer ring in a rotationally fixed manner, wherein the seal race ring forms a seal raceway for the main seal.

In the context of the invention, the seal race ring combines a plurality of functions. On the one hand, the seal race ring allows for a bridging of an axial distance in order to compensate the different length of outer ring and inner ring. The outer ring can thereby be formed as narrowly as possible, wherein the width of the inner ring is determined by the position of the raceways of the two rows of tapered rollers.

The seal race ring furthermore also forms the seal raceway for the main seal. The seal race ring, which is manufactured separately and which is attached to the outer ring, can also be released retroactively and can be replaced or machined, if necessary, without a disassembly of the entire tapered roller bearing. This thus results in the advantage that the seal race ring comprising the seal raceway formed thereon can be replaced or also finished in the case of a wear. In the case of a maintenance, only the sealing assembly has to be at least partially disassembled, although the inner ring, which is usually at least divided into two parts in the axial direction, as well as the outer ring can remain in their assembly position.

This also results in the advantage that the seal race ring can be handled much more easily due to its cross-sectional surface, which is small as compared to the inner ring and the outer ring. A fine machining, coating or hardening of the seal raceway is thus also facilitated significantly, wherein a coating can readily also be renewed after a disassembly.

Finally, the material of the seal race ring can also be selected in consideration of the specific demands and can in particular differ in the material of the inner ring as well as of the outer ring. A material can be selected, for example, which is suitable for forming a particularly smooth seal raceway and which, in combination with the material of the main seal, comprises a particularly low friction coefficient.

The seal race ring is usually made of metal, although other materials, including plastics and composite materials, are also considered, depending on the loads that arise.

Due to the fact that the seal race ring is formed as separate part, the geometry can also be adapted easily to the respective requirements. In the simplest case, the seal race ring has a cylindrical shape. Based on such a basic shape, other variations can also be considered, however. If, for example, not only a distance in the axial direction, but also in the radial direction is to be bridged between the outer ring as well as the main seal arranged on the inner ring, the seal race ring can also comprise an unwinding. The seal race ring can have, e.g., an L-shape. A step can furthermore also be provided in the region of the seal raceway, in order to provide for an adaptation to the dimension of the main seal.

According to a preferred embodiment of the invention, it is provided that the seal raceway is formed by a radial inner surface of the seal race ring.

Finally, other variations, which differ from a cylindrical shape, are also possible.

According to a further development of the invention, it is provided that a labyrinth is formed by moldings, which are complementary to one another, on the inner ring on the one hand and the seal race ring on the other hand. Protrusions, which overlap in the radial direction and thus form a labyrinth, can be provided on the inner ring and the seal race ring, for example, with an axial offset. Such a labyrinth can be provided for further protecting the seal gap and for reducing a leakage rate of a lubricant.

In the context of the invention, the gap between inner ring and outer ring is sealed on at least one side of the tapered roller bearing by the described sealing assembly. Such a sealing assembly, however, is usually present on both sides of the tapered roller bearing, wherein, according to a usual design, the tapered roller bearing can also be designed mirror-symmetrically with respect to a center plane or essentially mirror-symmetrically.

In the context of the invention, the sealing assembly is located on at least one side, i.e. front side, of the tapered roller bearing, wherein both front sides are preferably provided with a corresponding sealing assembly. In the context of the invention, the axial end regions, which adjoin on both sides of the outer ring in the axial direction, are referred to as front sides of the bearing.

The main seal is preferably formed with an elastic plastic. The main seal can thereby consist completely of the elastic plastic or can also be combined with other materials. For example, elastic spring rings, springs or other inserts made of metal can also be provided in order to improve the sealing properties. Additionally or alternatively, the elastic plastic can also be provided with admixtures and in particular reinforcing fibers.

For example acrylonitrile butadiene rubber (NBR), hydrogenated acrylonitrile butadiene rubber (HNBR), ethylene-propylene-diene rubber (EPDM), and elastomers on the basis of polyurethane are suitable as elastic plastic for the main seal. The listed elastic plastics are only exemplary. In particular materials, which are cross-linked by vulcanization are considered. Thermoplastic elastomers, however, are furthermore also considered.

The main seal can in particular comprise a sealing foot as well as an elastically resilient sealing leg adjoining the sealing foot, wherein the sealing leg lies against the seal raceway. The main seal can comprise, for example, the structural shape of a classic rotary shaft seal, which is optionally also provided with a spring or a metallic insert, respectively.

In addition to the main seal, the sealing assembly can comprise at least one separate secondary seal. Viewed from the front side of the tapered roller bearing, the main seal can be arranged, for example, downstream from a simple dust protection seal, so that contaminations and in particular particles can be kept away from the main seal.

Additionally or alternatively, a secondary seal can also be provided in the gap between the main seal as well as the tapered rollers.

In response to a lubrication of the tapered roller bearing with oil or fat, a seal in the form of a stuffing box can be provided for example between the tapered rollers on the one hand and the main seal on the other hand, wherein in particular a felt seal is suitable. Other seals and wiping elements can also be provided for minimizing the fat or oil quantity, respectively, which is located on the seal.

The seal race ring is attached to the outer ring in a rotationally fixed manner by means of connecting means. Screws, which engage with blind holes of the outer ring, are preferably provided as connecting elements. In the context of such an embodiment, the seal race ring can be disassembled after loosening the screws, wherein the remaining parts of the tapered roller bearing, in particular the outer ring and the inner ring, can remain in the assembled state. Other fastening types are generally also considered, however. If, for example, the described sealing assembly is provided on both front sides of the tapered roller bearing, the two seal race rings, which are located opposite one another on the outer ring, can thus be secured by a joint screw connection. For example a long screw can be provided for this purpose, which then engages through both seal race rings and is tightened by means of a nut. The seal race rings can generally also be clamped in a housing without separate screws. The at least one seal race ring can furthermore also be secured to the outer ring by a joint screw connection. For a simple and exact positioning of the seal race ring, centering pins or other guide and positioning means can also be provided.

A static seal is preferably provided between the outer ring and the seal race ring, which is attached to at least one front side in a rotationally fixed manner, in order to avoid an escape of lubricant on the contact surface between outer ring and seal race ring. However, comparatively low demands are to be made on such a static seal. A simple O-ring can be provided, for example, as static seal, wherein such an O-ring is then arranged in a groove, which is introduced into the outer ring or the associated contact surface of the seal race ring.

According to the invention, the main seal is attached to the inner ring in a rotationally fixed manner. According to a preferred further development of the invention, the inner ring comprises a groove on the front side, in order to be able to receive the main seal. Further embodiments, however, can also be considered for a fastening, for example the main seal can for instance also be attached to the inner ring in a rotationally fixed manner via a separate connecting ring.

The securing of the main seal to the inner ring can take place, for example, by a clamping ring or clamping segments, which follow one another around the circumference. Such a clamp assembly is fastened to the inner ring by connecting elements, in particular screws, wherein the inner ring comprises blind holes for receiving screws. When using clamping segments for applying a force to the main seal, a distance or gap can also remain between the clamping segments, which follow one another around the circumference, wherein a clamping between the segments can be securely avoided in response to the assembly.

When the main seal is held by a clamping ring or in another way by a clamping connection, a separate secondary seal can also be secured in a clamping manner together with the main seal. It is thus possible to arrange identical seals, or also seals, which differ in their structure and function, along the longitudinal direction of the tapered roller bearing, and to clamp them jointly, if necessary.

The seal raceway, which is preferably formed on a radial inner surface of the seal race ring, is hardened according to a preferred embodiment of the invention.

Specifically in the case of large-diameter roller bearings, an edge zone hardening, which can take place inductively, for example, is often provided in consideration of the production effort as well as the stability of the bearing. If hardening occurs inductively in a feed, the edge zone is formed successively as ring. Special protective measures are then possible on the joint between the beginning and the end of the hardening. Depending on the material, a soft region has to remain in order to avoid a tear formation. Corresponding unhardened regions are also referred to as slip. However, inductively hardenable steels comprising a high nickel content are furthermore also known, in the case of which no tears appear even in the case of an overlap during the hardening process.

Additionally or alternatively to a hardening of the seal raceway, a coating can also be provided there. In the context of the invention, coatings can in particular be provided, which lead to a particularly low friction coefficient. It is important to note thereby that the forces exerted by the main seal are generally much smaller than the force effect on the raceways of the tapered rollers, so that a different surface machining and finishing is also possible.

In the context of the invention, the tapered roller bearing can be installed in different ways. With regard to the integration in a machine or system, the inner ring or the outer ring can optionally be installed in a stationary manner.

When the outer ring is installed in a stationary manner and the axis of rotation of the tapered bearing roller is arranged horizontally or approximately horizontally, the seal race ring can also be provided with a drainage channel as well as with a discharge bore for lubricant on a suitable, low-lying location.

Expediently starting at the tapered rollers, such a discharge bore is provided downstream from the main seal, in order to avoid an escape of the lubricant in the region of the front surface and in order to be able to discharge the lubricant in a controlled manner. In the context of such an embodiment, lubricant in the form of fat or oil can in particular also be fed into the bearing gap by a suitable feeding system.

According to a further development of the invention, it is provided that the main seal is mounted with at least one spacer ring. A spacer ring can be provided so as to be able to mount main seals of different width in a predetermined receiving space. The position of the main seal can furthermore also be varied by means of at least one spacer ring, for example as a function of whether the spacer ring is arranged upstream of or downstream from the main seal, viewed in the axial direction. The position, at which the main seal lies against the associated seal raceway of the seal ring, can also be varied accordingly. With regard to a wear, the service life of the tapered roller bearing can be increased even further by such a variation. When the seal raceway is locally at its wear limit, the bearing point or the bearing surface, respectively, of the main seal can be shifted into a region, which is not yet worn, by a different arrangement of the spacer ring.

A wind turbine comprising a machine housing arranged on a tower, and a rotor supporting rotor blades is also the subject matter of the invention, wherein the rotor is rotationally supported with respect to the machine housing by means of the above-described tapered roller bearing. The machine housing, which is also referred to as nacelle, is usually rotatably arranged on the tower, so as to adjust the longitudinal axis of the rotor according to the respective wind direction.

The tapered roller bearing according to the invention can generally also be used for the rotatable arrangement of the machine housing on the tower. The tower can be realized by different structural shapes. The tower can be made, for example, of a prefabricated mast or steel pipe segments, which are screwed to one another on flange connections. Hybrid towers are additionally also known, which are made of steel and concrete. For example the lattice structures can furthermore also be used.

As already described above, the inner ring is divided into two parts at least in the axial direction in the case of the O-arrangement according to the invention of the two rows of tapered rollers, so as to be able to assemble the roller elements between the outer ring and the inner ring in the predetermined inclined position.

The remaining rings, thus the outer ring, the seal race ring, which is provided on at least one side, as well as the optionally provided clamping ring, can be undivided in the axial direction as well as in the circumferential direction. It goes without saying that rings can also be considered, however, which are segmented in the axial direction and/or in the circumferential direction.

Figure 2:
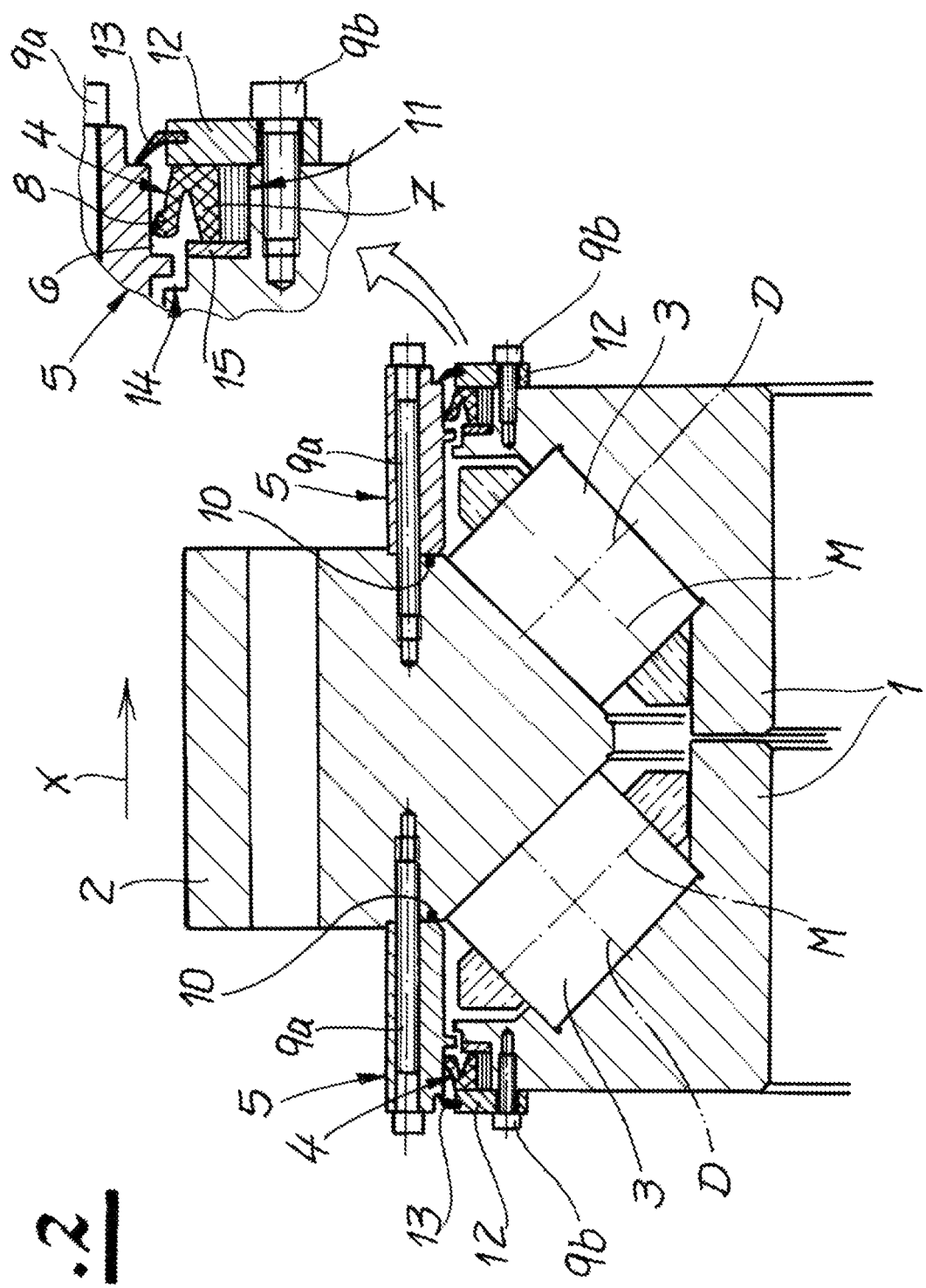
FIG. 2 is a sectional view of another example tapered roller bearing.

FIG. 1 to FIG. 3 show a tapered roller bearing according to the invention, which is embodied as large-diameter tapered roller bearing comprising a race diameter of more than 500 mm, in particular of more than 1000 mm.

The tapered roller bearing comprises an inner ring 1, which is divided in the axial direction X, an outer ring 2, as well as two rows of tapered rollers 3, which are arranged in an O-arrangement between the inner ring 1 and the outer ring 2. According to the O-arrangement, the central axes M of the tapered rollers 3 of the two rows are arranged in a V-shaped manner, wherein the central axes M intersect with an offset in the direction of the inner ring 1.

For improved clarity, only an upper section of the tapered roller bearing is illustrated in the figures. A lower section of the tapered roller bearing follows from a mirroring of the illustrated section about the horizontally arranged axis of rotation of the tapered roller bearing. With regard to the entire tapered roller bearing, the pressure curves D delineated in FIG. 1 form an O-shape in the broadest sense, from which the name O-arrangement results.

Due to the inclination of the tapered rollers 3 in the O-arrangement, the raceways on the outer ring 1 are offset with respect to the raceways of the outer ring 2 along the axial direction X towards a middle region. This alone results in that a larger length along the axial direction X as compared to the outer ring 2 is necessary on the inner ring 1 for the embodiment of the raceways. To save material and weight, the outer ring 2 is manufactured as narrowly as possible.

A gap between inner ring 1 and outer ring 2 is sealed on both front sides of the tapered roller bearing in each case by a sealing assembly. According to the invention, each sealing assembly comprises a main seal 4, which is attached to the inner ring 1 in a rotationally fixed manner, as well as a seal race ring 5, which is attached to the outer ring 2 in a rotationally fixed manner and which forms a seal raceway 6 for the main seal 4.

According to the invention, the seal raceway 6 is thus formed on a separate element in the form of the seal race ring 5, so that a replacement or a maintenance, respectively, is possible in the case of damage to the seal raceway 6. The seal raceway 6 can be adversely affected, for example by wear. The seal raceway 6 can furthermore also be damaged, for example scratched, in response to the assembly, whereby such damage can then be remedied comparatively easily in the context of the invention.

Even in the case of an assembled tapered roller bearing, the sealing assembly comprising the seal race ring 5 and the main seal 4 can be removed at least in the case of the illustrated embodiment, without having to remove or disassemble, respectively, the entire tapered roller bearing.

This also results in the advantage that the seal race ring 5 can be formed as separate element of an adapted material. Unlike in the case of the raceways of the inner ring 1 as well as of the outer ring 2, no high punctual mechanical loads appear, although a low sliding friction between the seal raceway 6 and the associated main seal 4 is strived for, especially on a long-term basis.

It can also be seen from FIG. 1 that the seal race ring 5 is comparatively small and light as compared to the inner ring 1 and outer ring 2, and can thus also be handled more easily in response to the production, assembly and maintenance. It is in particular possible to subject the seal raceway 6 to a surface treatment or surface coating with less effort. The seal raceway 6 can, for example, be hardened, in particular edge zone hardened and/or can be provided with a suitable sliding layer.

In the illustrated exemplary embodiment, the main seal 4 is embodied in the manner of a rotary shaft seal. The main seal 4 accordingly comprises a sealing foot 7 as well as sealing leg 8, which adjoins the sealing foot 7 and which lies against the seal raceway 6 with its end. The seal race ring 5 is attached to the outer ring 2 in a rotationally fixed, yet releasable manner by screws 9a, wherein a static seal 10, for example an O-ring, is arranged in an associated groove between the outer ring 2 and the seal race ring 5. The groove for the static seal 10 can optionally be formed in the outer ring 2 or the associated contact surface of the seal race ring 5.

For receiving the main seal 4, the inner ring 1 comprises a groove 11 on the front side, wherein the main seal 4 is held in the groove 11 on the front side by a clamping ring 12 or clamping segments. The clamping ring 12 is fastened to the inner ring 1 by means of screws 9b, wherein the screws 9b engage with associated blind holes.

The clamping ring 12 also supports a dust protection seal 13, which protects the main seal 4 against contaminations from the outside.

The described features have been realized so as to coincide with one another in the case of the embodiments of FIGS. 1 to 3, wherein the different embodiments differ in the concrete design of the sealing assembly.

According to FIG. 1, the seal raceway 6 is located on a stepped region of the seal race ring 5, in order to provide for an adaptation to the geometry of the main seal 4.

According to FIG. 2, a labyrinth 14 is formed by moldings, which are complementary to one another, on the inner ring 1 on the one hand and the seal race ring 5 on the other hand. To embody the labyrinth 14, a protrusion facing to the outside is arranged on the inner ring 1, and a protrusion facing to the inside is arranged on the seal race ring 5 with an axial offset relative to one another.

It is furthermore illustrated in FIG. 2 as a variant that a spacer ring 15 can be provided for clamping the main seal 4 in the axial direction X by means of the clamping ring 12 also for the longitudinal adaptation.

According to the embodiments according to FIG. 1 and FIG. 2, the sealing assemblies provided on both front sides of the tapered roller bearing each have a main seal 4 and a secondary seal in the form of a dust protection seal 13. Such a combination of seals is only exemplary. Two main seals 4 can generally also be arranged one behind the other in the axial direction.

FIG. 3 shows a further possible variant, in the case of which a felt ring 16 is provided for an improved sealing. The felt ring 16 engages with a depression 17 of the seal race ring 5, which is adjacent to the seal raceway 6, wherein the felt ring 16 is attached to the inner ring 1 in a rotationally fixed manner. The felt ring 16 is concretely clamped by the clamping ring 12 in the axial direction X via an intermediate ring 18, together with the main seal 4.

What is claimed is:

1. A tapered roller bearing comprising:
   an inner ring;
   an outer ring, wherein the inner ring extends in an axial direction over a greater length than the outer ring;
   two rows of tapered rollers that are arranged in an O-arrangement between the inner ring and the outer ring; and
   a sealing assembly that seals a gap between the inner ring and the outer ring on at least one side, wherein the sealing assembly comprises:
   a main seal that is attached to the inner ring in a rotationally-fixed manner, and
   a seal race ring that is attached to the outer ring in a rotationally-fixed manner, wherein the seal race ring forms a seal raceway for the main seal
   wherein the main seal comprises a sealing foot and a sealing leg that adjoins the sealing foot, wherein the sealing leg lies against the seal raceway,
   wherein the sealing leg extends from the sealing foot axially inwardly and radially outwardly, and
   a secondary seal disposed axially outwardly relative to and separate from the main seal.

2. The tapered roller bearing of claim 1 wherein the main seal is inserted into a groove on a front side of the inner ring.

3. The tapered roller bearing of claim 1 wherein the main seal is held on an associated front side of the inner ring by a clamping ring or clamping segments distributed around a circumference.

4. The tapered roller bearing of claim 1 wherein the seal race ring is screwed to the outer ring.

5. The tapered roller bearing of claim 1 comprising a labyrinth formed by moldings, which are complementary to one another, on the inner ring and on the seal race ring.

6. The tapered roller bearing of claim 1 comprising a joint clamping connection that holds the main seal and the secondary seal.

7. The tapered roller bearing of claim 1 wherein the main seal is comprised of elastic plastic.

8. The tapered roller bearing of claim 1 wherein the seal raceway is hardened.

9. The tapered roller bearing of claim 1 wherein the seal raceway is provided with a coating.

10. The tapered roller bearing of claim 1 wherein the main seal is mounted with a spacer ring.

\* \* \* \* \*